United States Patent
Nakamura et al.

(10) Patent No.: US 10,745,505 B2
(45) Date of Patent: Aug. 18, 2020

(54) GRAFT COPOLYMER AND ACRYLIC RESIN COMPOSITION CONTAINING SAME

(71) Applicant: KANEKA CORPORATION, Osaka (JP)

(72) Inventors: Mitsuru Nakamura, Hyogo (JP); Fuminobu Kitayama, Hyogo (JP)

(73) Assignee: KANEKA CORPORATION, Osaka (JP)

( * ) Notice: Subject to any disclaimer, the term of this patent is extended or adjusted under 35 U.S.C. 154(b) by 15 days.

(21) Appl. No.: 16/138,245

(22) Filed: Sep. 21, 2018

(65) Prior Publication Data

US 2019/0023828 A1 Jan. 24, 2019

Related U.S. Application Data

(63) Continuation-in-part of application No. PCT/JP2017/012387, filed on Mar. 27, 2017.

(30) Foreign Application Priority Data

Mar. 28, 2016 (JP) .................... 2016-064188

(51) Int. Cl.
| | |
|---|---|
| *C08F 265/06* | (2006.01) |
| *C08F 285/00* | (2006.01) |
| *C08L 33/12* | (2006.01) |
| *C08J 5/18* | (2006.01) |

(52) U.S. Cl.
CPC .......... *C08F 265/06* (2013.01); *C08F 285/00* (2013.01); *C08J 5/18* (2013.01); *C08L 33/12* (2013.01); *C08F 2800/20* (2013.01); *C08J 2333/12* (2013.01); *C08J 2451/00* (2013.01)

(58) Field of Classification Search
CPC ............................ C08F 285/00; C08F 265/06
See application file for complete search history.

(56) References Cited

U.S. PATENT DOCUMENTS

| 3,793,402 A | | 2/1974 | Owens | |
|---|---|---|---|---|
| 4,550,061 A | * | 10/1985 | Sachdev | ................ B41M 5/245 |
| | | | | 427/388.2 |
| 2017/0067593 A1 | * | 3/2017 | Mitsumoto | .......... C23C 14/0036 |

FOREIGN PATENT DOCUMENTS

| JP | S55-27576 B2 | 7/1980 |
|---|---|---|
| JP | S57-085843 A | 5/1982 |

OTHER PUBLICATIONS

International Search Report issued in International Application No. PCT/JP2017/012387, dated Jun. 6, 2017 (2 pages).

* cited by examiner

*Primary Examiner* — Jeffrey C Mullis

(74) *Attorney, Agent, or Firm* — Osha Liang LLP

(57) ABSTRACT

A graft copolymer includes: an inner layer made of a hard polymer (I) obtained by polymerizing a monomer mixture including 40 to 100 wt % of a methacrylate ester 0 to 15 wt % of an aromatic vinyl monomer, and 0 to 45 wt % of another copolymerizable monomer and 0.01 to 10 parts by weight of a polyfunctional monomer; an intermediate layer made of a soft polymer (II) obtained by polymerizing a monomer mixture including 60 to 100 wt % of an acrylate ester and 0 to 40 wt % of another copolymerizable monomer, 0.01 to 5 parts by weight of allyl (meth)acrylate, and a di(meth)acrylic compound; and an outer layer made of a hard polymer (III) obtained by polymerizing a monomer mixture including 40 to 100 wt % of a methacrylate ester and 60 to 0 wt % of another copolymerizable monomer and 0 to 10 parts by weight of a polyfunctional monomer.

11 Claims, No Drawings

GRAFT COPOLYMER AND ACRYLIC RESIN COMPOSITION CONTAINING SAME

TECHNICAL FIELD

One or more embodiments of the present invention relate to a graft copolymer and an acrylic resin composition containing the graft copolymer.

BACKGROUND

Acrylic resins are excellent polymers used in large amounts in various industrial fields for their excellent transparency, color, appearance, weather resistance, luster, and processability. However, an essential disadvantage of acrylic resins is their poor impact resistance. As general methods for improving the impact resistance of an acrylic resin, various methods have been proposed in which a multilayer structure polymer having a rubber layer is introduced into an acrylic resin to form a two-phase structure to develop strength.

As an example of such a multilayer structure polymer introduced to improve impact resistance, Patent Literature 1 discloses a three-layer structure obtained by polymerizing an innermost layer mainly containing methyl methacrylate, then polymerizing a second layer mainly containing butyl acrylate in the presence of the innermost layer, and further polymerizing an outermost layer mainly containing methyl methacrylate.

However, when a multilayer structure polymer having a large particle diameter is mixed to improve impact resistance, the transparency of a resulting molded article is impaired. On the other hand, when a multilayer structure polymer having a small particle diameter is mixed, a resulting molded article has excellent transparency but its strength is low. For this reason, there has been a demand for a multilayer structure polymer excellent in both impact resistance and transparency.

CITATION LIST

Patent Literature

PTL 1: JP-B-55-27576

SUMMARY

One or more embodiments of the present invention relate to a graft copolymer that can provide an acrylic resin composition molded article excellent in tranparency and mechanical properties such as impact resistance including Izod strength, and an acrylic resin composition containing such a graft copolymer.

The present inventors have intensively studied about a graft copolymer having a rubber layer obtained by using specific types of cross-linking agents in combination at a specific ratio, leading to the completion of the present invention.

More specifically, one or more embodiments of the present invention is directed to a graft copolymer comprising at least the following inner layer, intermediate layer, and outer layer, wherein a polymer obtained by perforating up to polymerization for forming the intermediate layer has an average particle diameter of 40 to 150 nm (hereinafter, also referred to as "graft copolymer according to one or more embodiments of the present invention"):

inner layer: a hard polymer (I) obtained by polymerizing a monomer mixture (a) comprising 40 to 100 wt % of a meth acrylate ester, 0 to 15 wt % of an aromatic vinyl monomer, and 0 to 45 wt % of another monomer having a copolymerizable double bond and 0.01 to 10 parts by weight of a polyfunctional monomer (per 100 parts by weight of a total amount of the monomer mixture (a));

intermediate layer: a soft polymer (II) obtained by polymerizing a monomer mixture (b) comprising 60 to 100 wt % of an acrylate ester and 0 to 40 wt % of another monomer having a double bond copolymerizable with the acrylate ester, 0.01 to 5 parts by weight of allyl(meth)acrylate (per 100 parts by weight of a total amount of the monomer mixture (b)), and a di(meth)acrylic compound used in an amount such that a molar ratio of the di(meth)acrylic compound to the allyl (meth)acrylate [(molar number of di(meth)acrylic compound)/(molar number of allyl (meth)acrylate)] is 0.3 to 1.6; and outer layer: a hard polymer (III) obtained by polymerizing a monomer mixture (c) comprising 40 to 100 wt % of a methacrylate ester and 60 to 0 wt % of another monomer having a double bond copolymerizable with the methacrylate ester and 0 to 10 parts by weight of a polyfunctional monomer (per 100 parts by weight of a total amount of the monomer mixture (c)).

The graft copolymer according to one or more embodiments of the present invention preferably comprises 5 to 15 wt % of the inner layer, 55 to 75 wt % of the intermediate layer, and 20 to 30 wt % of the outer layer.

In the graft copolymer according to one or more embodiments of the present invention, the di(meth)acrylic compound is preferably ethylene glycol di(meth)acrylate represented by the following formula (1) and/or propylene glycol di(meth)acrylate represented by the following formula (2):

[Chemical Formula 1]

Formula (1)

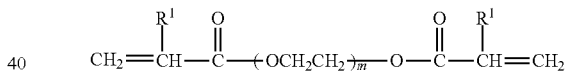

(wherein $R^1$ is H or $CH_3$ and in is 3 to 15);

[Chemical Formula 2]

Formula (2)

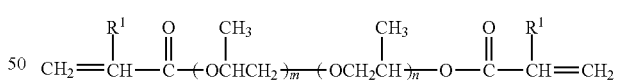

(wherein $R^1$ is H or $CH_3$, m and n are each 0 to 13, and m+n is 3 to 13).

In the graft copolymer according to one or more embodiments of the present invention, the monomer mixture (a) preferably comprises 40 to 99.9 wt % of a methacrylate ester, 0.1 to 35 wt % of an acrylate ester, 0 to 15 wt % of an aromatic vinyl monomer, and 0 to 10 wt % of another monomer having a copolymerizable double bond.

The graft copolymer according to one or more embodiments of the present invention, preferably has a 1% weight loss temperature of 260° C. or higher as measured by TGA and a 5% weight loss temperature of 310° C. or higher as measured by TGA.

A resin composition according to one or more embodiments of the present invention comprises the graft copolymer according to one or more embodiments of the present invention and an acrylic resin.

The resin composition according to one or more embodiments of the present invention preferably comprises 60 to 2 wt % of the graft copolymer and 40 to 98 wt % of the acrylic resin (per 100 wt % of a total amount of the acrylic resin and the graft copolymer).

A molded article according to one or more embodiments of the present invention is obtained by molding the resin composition described herein.

The molded article according to one or more embodiments of the present invention may be an injection molded article or a film.

A method for producing a graft copolymer according to one or more embodiments of the present invention comprises performing multistage polymerization comprising the following polymerization stages (I) to (III):

(I) polymerizing a monomer mixture (a) comprising 40 to 100 wt % of a methacrylate ester, 0 to 15 wt % of an aromatic vinyl monomer, and 0 to 45 wt % of another monomer having a copolymerizable double bond and 0.01 to 10 pans by weight of a polyfunctional monomer (per 100 parts by weight of a total amount of the monomer mixture (a)) to form a hard polymer (I);

(II) polymerizing, in a presence of the hard polymer (I), a monomer mixture (b) comprising 60 to 100 wt % of an acrylate ester and 0 to 40 wt % of another monomer having a double bond copolymerizable with the acrylate ester, 0.01 to 5 pans by weight of an allyl(meth)acrylate (per 100 parts by weight of a total amount of the monomer mixture (b)), and a di(meth)acrylic compound used in an amount such that a molar ratio of the di(meth)acrylic compound to the allyl (meth)acrylate [(molar number of di(meth)acrylic compound)/(molar number of allyl (meth)acrylate)] is 0.3 to 1.6 to form a soft polymer (II); and (III) polymerizing, in a presence of the hard polymer (II), a monomer mixture (c) comprising 40 to 100 wt % of a methacrylate ester and 60 to 0 wt % of another monomer having a double bond copolymerizable with the methacrylate ester and 0 to 10 parts by weight of a polyfunctional monomer (per 100 parts by weight of a total amount of the monomer mixture (c)) to form a hard polymer (III), wherein a polymer formed by performing up to the polymerization stage (II) has an average particle diameter of 40 to 150 nm.

According to one or more embodiments of the present invention, it is possible to provide a graft copolymer that can provide an acrylic resin composition molded article that is excellent in transparency and mechanical properties such as impact resistance including Izod strength, and an acrylic resin composition containing the graft copolymer.

DETAILED DESCRIPTION OF THE EMBODIMENTS

Hereinbelow, one or more embodiments of the present invention will be described in detail. However, one or more embodiments of the present invention is not limited to these embodiments.

(Graft Copolymer)

By adding a graft copolymer according to one or more embodiments of the present invention to an acrylic resin, it is possible to provide a molded article excellent in both transparency and mechanical strength.

Preferred examples of the graft copolymer according to one or more embodiments of the present invention include a multistage-polymerized polymer and a multilayer structure polymer (also referred to as core-shell type polymer). The multistage-polymerized polymer is a polymer obtained by polymerizing a monomer mixture in the presence of polymer particles, and the multilayer structure polymer is a polymer (core-shell type polymer) having a polymer layer obtained by polymerizing a monomer mixture in the presence of polymer particles. Both the polymers basically refer to the same polymer, but the former is a polymer defined mainly on the basis of its production method, and the latter is a polymer defined mainly on the basis of its layer structure. The former will be mainly described below, but the same applies to the latter.

The graft copolymer according to one or more embodiments of the present invention is a multilayer structure polymer comprising at least an inner layer, an intermediate layer, and an outer layer, and can be obtained by multistage polymerization comprising the following polymerization stages (I) to (III).

(I) polymerizing a monomer mixture (a) comprising 40 to 100 wt % of a methacrylate ester, 0 to 15 wt % of an aromatic vinyl monomer, and 0 to 45 wt % of another monomer having a copolymerizable double bond and 0.01 to 10 parts by weight of a polyfunctional monomer (per 100 parts by weight of a total amount of the monomer mixture (a)) to form a hard polymer (I);

(II) polymerizing, in the presence of the hard polymer (I), a monomer mixture (b) comprising 60 to 100 wt % of an acrylate ester and 0 to 40 wt % of another monomer having a double bond copolymerizable with the acrylate ester, 0.01 to 5 parts by weight of allyl (meth)acrylate (per 100 parts by weight of the total amount of the monomer mixture (b)), and a di(meth)acrylic compound used in an amount such that the molar ratio of the di(meth)acrylic compound to the allyl (meth)acrylate [(molar number of di(meth)acrylic compound)/(molar number of allyl (meth)acrylate)] is 0.3 to 1,6 to form a soft polymer (II); and (III) polymerizing, in the presence of the hard polymer (II), a monomer mixture (c) comprising 40 to 100 wt % of a methacrylate ester and 60 to 0 wt % of another monomer having a double bond copolymerizable with the methacrylate ester and 0 to 10 parts by weight of a polyfunctional monomer (per 100 parts by weight of the total amount of the monomer mixture (c)) to form a hard polymer (III).

(Inner Layer)

The inner layer of the graft copolymer according to one or more embodiments of the present invention is formed by obtaining a hard polymer (I) by polymerizing a monomer mixture (a) comprising 40 to 100 wt % of a methacrylate ester, 0 to 15 wt % of an aromatic vinyl monomer, and 0 to 45 wt % of another monomer having a copolymerizable double bond and 0.01 to 10 parts by weight of a polyfunctional monomer (per 100 parts by weight of the total amount of the monomer mixture (a)).

The monomer mixture (a) preferably comprises 40 to 100 wt % of a methacrylate ester, 0 to 35 wt % of an acrylate ester, 0 to 15 wt % of an aromatic vinyl monomer, and 0 to 10 wt % of another monomer having a copolymerizable double bond, more preferably comprises 40 to 99.9 wt % of a methacrylate ester, 0.1 to 35 wt % of an acrylate ester, 0 to 15 wt % of an aromatic vinyl monomer, and 0 to 10 wt % of another monomer having a copolymerizable double bond, even more preferably comprises 40 to 99.8 wt % of a methacrylate ester, 0.1 to 35 wt % of an acrylate ester, 0.1 to 15 wt % of an aromatic vinyl monomer, and 0 to 10 wt % of another monomer having a copolymerizable double bond, and still more preferably comprises 51 to 96.9 wt % of a methacrylate ester, 3.1 to 29 wt % of an acrylate ester, 0 to 10 wt % of an aromatic vinyl monomer, and 0 to 10 wt % of another monomer having a copolymerizable double bond. By setting the amount of each of the monomers in the monomer mixture (a) to a value within the above range, the graft copolymer can have high thermal stability and can withstand high-temperature molding. More specifically, the methacrylate ester as a main component is likely to be thermally decomposed during high-temperature molding due to zipping depolymerization, but by setting the amount of each of the acrylate ester and the aromatic vinyl monomer to a value within the above range, such zipping depolymerization can be easily prevented and thermal stability can be improved.

Particularly preferably, the monomer mixture (a) comprises 51 to 96.8 wt % of a methacrylate ester, 3.1 to 29 wt % of an acrylate ester, 0.1 to 10 wt % of an aromatic vinyl monomer, and 0 to 10 wt % of another monomer having a copolymerizable double bond. By setting the amount of each of the monomers in the monomer mixture (a) to a value within the above range, as described above, zipping depolymerization can be prevented to improve thermal stability, and the graft copolymer can be mixed with an acrylic resin without impairing the optical properties, such as transparency and color, of the acrylic resin.

If the methacrylate ester content of the monomer mixture (a) is less than 40 wt %, the excellent characteristics of the acrylic resin are not developed.

Examples of the methacrylate ester include methyl methacrylate, ethyl methacrylate, n-butyl methacrylate, isobutyl methacrylate, t-butyl methacrylate, hexyl methacrylate, cyclohexyl methacrylate, 2-ethylhexyl methacrylate, octyl methacrylate, isobornyl methacrylate, phenyl methacrylate, and benzyl methacrylate. Preferably, the methacrylate ester is an alkyl methacrylate ester whose alkyl group has 1 to 4 carbon atoms, and examples of such an alkyl methacrylate ester include methyl methacrylate, ethyl methacrylate, n-butyl methacrylate, isobutyl methacrylate, and t-butyl methacrylate. These methacrylate esters may be used singly or in combination of two or more of them. Particularly preferably, the methacrylate ester is methyl methacrylate.

Examples of the aromatic vinyl monomer include styrene, α-methylstyrene, chlorostyrene, and another styrene derivative.

The another monomer having a copolymerizable double bond is preferably at least one selected front the group consisting of an acrylate ester and another monomer having a copolymerizable double bond (another copolymerizable monomer), and is more preferably at least one selected from the group consisting of an alkyl acrylate ester whose alkyl group has 1 to 12 carbon atoms and another copolymerizable monomer. Among them, from the viewpoint of sufficiently improving impact strength and achieving excellent transparency, the another monomer having a copolymerizable double bond is preferably an acrylate ester, and is more preferably an alkyl acrylate ester whose alkyl group has 1 to 12 carbon atoms. Examples of the acrylate ester include an alkyl acrylate ester whose alkyl group has 1 to 12 carbon atoms, isobornyl acrylate, phenyl acrylate, and benzyl acrylate. Examples of the alkyl acrylate ester whose alkyl group has 1 to 12 carbon atoms include ethyl acrylate, n-butyl acrylate, n-octyl acrylate, acrylate, and cyclohexyl acrylate. Examples of the another copolymerizable monomer include: an unsaturated nitrile-based monomer such as acrylonitrile or methacrylonitrile; an α,β-unsaturated carboxylic acid such as acrylic acid, methacrylic acid, or crotonic acid; vinyl acetate; an olefin-based monomer such as ethylene or propylene; a vinyl halide-based monomer such as vinyl chloride, vinylidene chloride, or vinylidene fluoride; and a maleimide-based monomer such as N-ethyl maleimide, N-propyl maleimide, N-cyclohexyl maleimide, N-o-chlorophenyl maleimide. These copolymerizable monomers may be used singly or in combination of two or more of them.

The amount of the polyfunctional monomer used in the polymerization stage for forming the inner layer is 0.01 to 10 parts by weight, preferably 0.01 to 7 parts by weight, more preferably 0.01 to 5 parts by weight, most preferably 0.01 to 2 parts by weight per 100 parts by weight of the total amount of the monomer mixture (a). If the amount of the polyfunctional monomer used is less than 0.01 parts by weight, a resulting molded article has low transparency, and if the amount of the polyfunctional monomer used exceeds 10 parts by weight, the effect of improving impact strength is reduced.

The polyfunctional monomer to be used may be either one known as a cross-linking agent or one known as a cross-linkable monomer. Preferred examples of the cross-linkable monomer include allyl methacrylate, allyl acrylate, diallyl maleate, diallyl fumarate, diallyl itaconate, monoallyl maleate, monoallylfumarate, butadiene, and divinyl benzene. Among them, allyl(meth)acrylate is more preferred, and allyl methacrylate is even more preferred. These cross-linkable monomers may be used singly or in combination of two or more of them.

(Intermediate Layer)

The intermediate layer of the graft copolymer according to one or more embodiments of the present invention is formed by obtaining a soft polymer (II) by polymerizing, in the presence of the hard polymer (I), a monomer mixture (b) comprising 60 to 100 wt % of an acrylate ester and 0 to 40 wt % of another monomer having a double bond copolymerizable with the acrylate ester, 0.01 to 5 parts by weight of allyl (meth)acrylate (per 100 parts by weight of the total amount of the monomer mixture (b)), and a di(meth)acrylic compound used in an amount such that the molar ratio (mole ratio) of the di(meth)acrylic compound to the allyl (meth) acrylate [(molar number of di(meth)acrylic compound)/(molar number of allyl (meth)acrylate)] is 0.3 to 1.6.

The another monomer having a copolymerizable double bond is preferably at least one selected from the group consisting of an aromatic vinyl monomer, a methacrylate ester, and another monomer having a copolymerizable double bond.

The monomer mixture (b) preferably comprises 60 to 100 wt % of an acrylate ester, 0 to 40 wt % of an aromatic vinyl monomer, and 0 to 20 wt % of another monomer having a copolymerizable double bond. From the viewpoint of obtaining a molded article excellent in transparency and color, the monomer mixture (b) more preferably comprises 60 to 100 wt % of an acrylate ester, 0 to 10 wt % of a methacrylate ester, 0 to 40 wt % of an aromatic vinyl monomer, and 0 to 10 wt % of another monomer having copolymerizable double bond.

Specific examples of the acrylate ester are the same as those mentioned above. Among them, an alkyl acrylate ester Whose alkyl group has 1 to 12 carbon atoms is preferred. These acrylate esters may be used singly or in combination of two or more of them. Specific examples of the alkyl acrylate ester Whose alkyl group has 1 to 12 carbon atoms are the same as those mentioned above. The acrylate ester is preferably n-butyl acrylate, a combination of n-butyl acrylate and ethyl acrylate, or a combination of n-butyl acrylate and 2-ethylhexyl acrylate. The n-butyl acrylate content of the acrylate ester used in the polymerization stage for forming the intermediate layer is preferably 50 to 100 wt %, more preferably 70 to 100 wt %, particularly preferably 90 to 100 wt %.

The methacrylate ester, the aromatic vinyl monomer, and the another monomer having a copolymerizable double bond other than the methacrylate ester and the aromatic vinyl monomer used in the polymerization stage for forming the intermediate layer are the same as the methacrylate ester, the aromatic vinyl monomer, and the another copolymerizable monomer described above with reference to the monomer mixture (a).

The allyl (meth)acrylate used in the polymerization stage for forming the intermediate layer is used mainly to chemically bond the soft polymer (II) forming the intermediate layer and the hard polymer (III) forming the outer layer. The amount of the allyl (meth)acrylate used in polymerization for forming the intermediate layer is 0.01 to 5 pails by weight, preferably 0.01 to 4 parts by weigh more preferably 0.1 to 4 parts by weight, even more preferably 0.2 to 3.5 parts by weight per 100 parts by weight of the total amount of the monomer mixture (b). In either case where the amount of the allyl (meth)acrylate used is less than 0.01 parts by weight or exceeds 5 parts by weight, the effect of improving the impact strength of a molded article is reduced.

The di(meth)acrylic compound used in the polymerization stage for forming the intermediate layer may be a generally-known diacrylic compound or dimethacrylic compound. Examples of the diacrylic compound include 1,3-butylene glycol diacrylate, 1,4-butanediol diacrylate, 1,6-hexanediol diacrylate, 1,8-octanediol diacrylate, 1,9-nonanediol diacrylate, 1,10-decanediol diacrylate, ethylene glycol diacrylate, propylene glycol diacrylate, alkoxylated aliphatic diacrylate, alkoxylated cyclohexanedimethanol diacrylate, alkoxylated hexanediol diacrylate, alkoxylated neopentyl glycol diacrylate, caprolactone-modified neopentyl glycol hydroxypivalate diacrylate, cyclohexane dimethanol diacrylate, diethylene glycol diacrylate, dipropylene glycol diacrylate, bisphenol A diacrylate, ethoxylated bisphenol A diacrylate, hydroxypivalaldehyde-modified trimethylolpropane diacrylate, neopentyl glycol diacrylate, propoxylated neopentyl glycol diacrylate, tricyclodecanedimethanol diacrylate, triethylene glycol diacrylate, tripropylene glycol diacrylate, tetraethylene glycol diacrylate, polyethylene glycol diacrylate, and polypropylene glycol diactylate. Examples of the dimethacrylic compound include 1,3-butylene glycol dimethacrylate, 1,4-butanediol dimethacrylate, 1,6-hexanediol dimethacrylate, 1,8-octanediol dimethacrylate, 1,9-nonanediol dimethacrylate, 1,10-decanediol dimethacrylate, glycerin dimethacrylate, tetramethylene glycol dimethacrylate, ethylene glycol dimethacrylate, diethylene glycol dimethacrylate, triethylene glycol dimethacrylate, tetraethylene glycol dimethacrylate, polyethylene glycol dimethacrylate, propylene glycol dimethacrylate, dipropylene glycol dimethacrylate, tripropylene glycol dimethacrylate, polypropylene glycol dimethacrylate, neopentyl glycol dimethacrylate, pentaerythritol dimethacrylate, dipentaerythritol dimethacrylate, bisphenol A dimethacrylate, ethoxylated bisphenol A dimethacrylate, and tricyclodecanedimethanol dimethacrylate.

Among them, long-chain alkanediol di(meth)acrylates such as 1,3-butylene glycol di(meth)acrylate, 1,4-butanediol di(meth)acrylate, 1,6-hexanediol di(meth)acrylate, 1,8-octanediol di(meth)acrylate, 1,9-nonanediol di(meth)acrylate, and 1,10-decanediol di(meth)acrylate, ethylene glycol di(meth)acrylates such as ethylene glycol di(meth)acrylate, diethylene glycol di(meth)acrylate, triethylene glycol di(meth)acrylate, tetraethylene glycol di(meth)acrylate, and polyethylene glycol di(meth)acrylate, and propylene glycol di(meth)acrylates such as propylene glycol di(meth)acrylate, dipropylene glycol di(meth)acrylate, tripropylene glycol di(meth)acrylate, and polypropylene glycol di(meth)acrylate are preferred, and ethylene glycol di(meth)acrylates and/or propylene glycol di(meth)acrylates are more preferred.

More specifically, preferred ethylene glycol di(meth)acrylates and propylene glycol di(meth)acrylates are compounds represented by the following formulas (1) and (2). Among them, from the viewpoint of properly improving impact strength and achieving transparency, m in the formula (1) is preferably in the range of 1 to 24, more preferably in the range of 2 to 17, even more preferably in the range of 3 to 15, and m+n in the formula (2) is preferably in the range of 1 to 24, more preferably in the range of 2 to 15, even more preferably in the range of 3 to 13.

Particularly, when m in the formula (1) and m+n in the formula (2) are each 2 or more, the compounds have an ether bond, which is preferred from the viewpoint of further enhancing the effect of improving impact strength.

Further, from the viewpoint of properly improving impact strength and achieving transparency, the molecular weight of the compound represented by the formula (1) is preferably 100 to 1200, more preferably 200 to 900, even more preferably 250 to 800. The molecular weight of the compound represented by the formula (2) is preferably 100 to 1600, more preferably 200 to 1000, even more preferably 300 to 900.

[Chemical Formula 3]

Formula (1)

(wherein $R^1$ is H or $CH_3$ and m is 1 to 24)

[Chemical Formula 4]

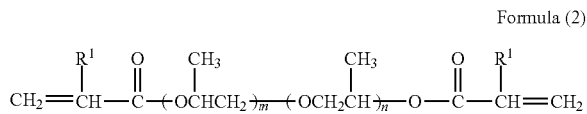

Formula (2)

(wherein $R^1$ is H or $CH_3$, m and n are each 0 to 24, and m+n is 1 to 24)

The di(meth)acrylic compound to be used may be any one of the above-mentioned compounds or a combination of two or more of the above-mentioned compounds.

The di(meth)acrylic compound used in polymerization for forming the intermediate layer is used mainly to form a crosslinked structure in the soft polymer (II) to allow the soft polymer (II) to exhibit its effect as an elastic body.

The combined use of the allyl (meth)acrylate and the di(meth)acrylic compound makes it possible to effectively achieve the effect of improving the impact strength of a molded article. The di(meth)acrylic compound is used in an amount such that the molar ratio (mole ratio) of the di(meth) acrylic compound to the allyl (meth)acrylate (molar number of di(meth)acrylic compound/molar number of allyl (meth) acrylate is 0.3 to 1.6. Here, the molar number refers to a physical amount determined by dividing the weight of the compound used by the molecular weight of the compound. The lower limit of the molar ratio of the di(meth)acrylic compound to the allyl(meth)acrylate is 0.3, preferably 0.32, more preferably 0.34, even more preferably 0.36, even more preferably 0.38, particularly preferably 0.4. The upper limit of the molar ratio is 1.6, preferably 1.4, more preferably 1,2, even more preferably 1.0, particularly preferably 0.9. If the lower limit of the molar ratio is less than 0.3, a crosslinked structure is not sufficiently formed in the soft polymer (II) so that the effect of improving impact strength cannot be sufficiently obtained. On the other hand, if the upper limit of the molar ratio exceeds 1.6, transparency is impaired.

The amount of the di(meth)acrylic compound to be used is not particularly limited as long as the molar ratio of the di(meth)acrylic compound to the allyl (meth)acrylate is within the above range. However, from the viewpoint of more effectively improving the impact strength of a molded article, the amount of the di(meth)acrylic compound to be used is preferably 0.01 to 10 parts by weight, more preferably 0.01 to 5 parts by weight, even more preferably 0.1 to 4 parts by weight, most preferably 0.2 to 3.5 parts by weight per 100 parts by weight of the total amount of the monomer mixture (b).

It is to be noted that the graft copolymer according to one or more embodiments of the present invention has a structure in which at least part, of the hard polymer (I) formed in the polymerization stage for forming the inner layer and located on the inner side of the graft copolymer is coated with the soft polymer (II) formed in the polymerization stage for forming the intermediate layer. Part, of the soft polymer (II) may penetrate into the hard polymer (I). The hard polymer (I) may, of course, be entirely coated with the soft polymer (II).

(Outer Layer)

The outer layer of the graft copolymer according to one or more embodiments of the present invention is formed by obtaining a hard polymer MD by polymerizing, in the presence of the soft polymer (II), a monomer mixture (c) comprising 40 to 100 wt % of a methacrylate ester and 60 to 0 wt % of another monomer having a double bond copolymerizable with the methacrylate ester and 0 to 10 parts by weight of a polyfunctional monomer (per 100 parts by weight of the total amount of the monomer mixture (c)).

The graft copolymer according to one or more embodiments of the present invention has a structure in which the hard polymer (III) is grafted on the hard polymer (I) and/or the soft polymer (II). However, all the hard polymer (III) does not need to be grafted, and part of the hard polymer (III) may be contained as a polymer component without being grafted on the hard polymer (I) and/or the soft polymer (II).

The hard polymer (III) forming the outer layer of the graft copolymer according to one or more embodiments of the present invention may be one obtained by polymerizing the monomer mixture (c) and the polyfunctional monomer, used if necessary, at a time or one obtained by polymerizing the monomer mixture (c) and the polyfunctional monomer, used if necessary, in two or more steps by changing the composition or ratio of the monomers. When the hard polymer (III) is obtained by polymerization performed in two or more steps, polymers obtained in these steps are represented as (III-1), (III-2), (III-3), and the like, respectively in the order they are formed by polymerization. That is, when polymerization is performed only once to obtain a hard polymer (III), the polymer (III-1) is the same as the hard polymer (III).

The monomer mixture (c) preferably comprises 40 to 100 wt % of a methacrylate ester, 50 to 0 wt % of an acrylate ester, and 10 to 0 wt % of another monomer having a double bond copolymerizable with the methacrylate ester.

Examples of the methacrylate ester are the same as those mentioned above with reference to the methacrylate ester used in the monomer mixture (a). Among them, an alkyl methacrylate ester Whose alkyl group has 1 to 4 carbon atoms is preferred. Preferred specific examples of the alkyl methacrylate ester are also the same as those mentioned above. These methacrylate esters may be used singly or in combination of two or more of them. However, methyl methacrylate is particularly preferred.

The another monomer having a copolymerizable double bond is preferably at least one selected from the group consisting of an acrylate ester, an aromatic vinyl monomer, and another monomer having a copolymerizable double bond, and is more preferably at least one selected from the group consisting of an alkyl acrylate ester whose alkyl group has 1 to 12 carbon atoms, an aromatic vinyl monomer, and another copolymerizable monomer. Examples of the acrylate ester the aromatic vinyl monomer, and the copolymerizable monomer other than the acrylate ester and the aromatic vinyl monomer are the same as those mentioned above with reference to the acrylate ester, the aromatic vinyl monomer, and the another copolymerizable monomer used in the monomer mixture (a). Preferred specific examples of the acrylate ester, the aromatic vinyl monomer, and the copolymerizable monomer other than the acrylate ester and the aromatic vinyl monomer are also the same as those mentioned above. Among them, the another monomer having a copolymerizable double bond is more preferably an acrylate ester, most preferably an alkyl acrylate ester whose alkyl group has 1 to 12 carbon atoms.

Examples of the polyfunctional monomer are the same as those mentioned above with reference to the polyfunctional monomer used for forming the inner layer. Preferred examples of the polyfunctional monomer are also the same as those mentioned above. However, the polyfunctional monomer does not always need to be used in polymerization for obtaining the hard polymer (III). The monomer mixture (c) may be the same as or different from the monomer mixture (a).

When the total amount of the monomer mixtures (a), (b), and (c) in the graft copolymer according to one or more embodiments of the present invention is 100 parts by weight, the weight ratio among the monomer mixtures (a), (b), and (c) is preferably 5 to 15 parts by weight: 55 to 75 parts by weight: 20 to 30 parts by weight, more preferably 5 to 14 parts by weight: 57 to 74 parts by weight: 21 to 29 parts by weight even more preferably 6 to 13 parts by weight: 59 to 73 parts by weight: 21 to 28 pails by weight, particularly preferably 6 to 12 parts by weight: 61 to 72 parts by weight: 22 to 27 parts by weight.

The graft copolymer according to one or more embodiments of the present invention is preferably obtained by the above described three-stage polymerization comprising the polymerization stages (I), (II), and (III). However, it is also preferred that the polymerization stage (III) is performed in two steps (III-1) and (III-2).

The graft copolymer according to one or more embodiments of the present invention preferably comprises 5 to 15 wt % of the inner layer, 55 to 75 wt % of the intermediate layer, and 20 to 30 wt % of the outer layer, more preferably comprises 5 to 14 wt % of the inner layer, 57 to 74 wt % of the intermediate layer, and 21 to 29 wt % of the outer layer, even more preferably comprises 6 to 13 wt % of the inner layer, 59 to 73 wt % of the intermediate layer, and 21 to 28 wt % of the outer layer, and particularly preferably comprises 6 to 12 wt % of the inner layer, 61 to 72 wt % of the intermediate layer, and 22 to 27 wt % of the outer layer.

The average particle diameter of a polymer obtained by performing up to polymerization for forming the intermediate layer of the graft copolymer according to one or more embodiments of the present invention is preferably 40 to 150 nm, more preferably 60 to 150 nm, even more preferably 80 to 150 nm, particularly preferably 90 to 140 nm. Here, the average particle diameter is determined by measuring 546-nm light scattered from a polymer latex with the use of a spectrophotometer.

If the average particle diameter is less than 40 nm, a composition obtained by adding the graft copolymer to an acrylic resin is less likely to have adequate impact resistance, and if the average particle diameter exceeds 150 μn, a composition obtained by adding the graft copolymer to an acrylic resin is less likely to have excellent transparency.

In the polymerization stages (I) to (III) performed to obtain the graft copolymer according to one or more embodiments of the present invention, monomer polymerization may be performed in the presence of a chain transfer agent, if necessary. The chain transfer agent is not particularly limited, and may be a generally-known chain transfer agent. Specific examples of the chain transfer agent include: an alkyl mercaptan-based chain transfer agent such as n-butyl mercaptan, n-octyl mercaptan, n-hexadecyl mercaptan, n-dodecyl mercaptan, n-tetradecyl mercaptan, s-butyl mercaptan, s-dodecyl mercaptan, t-dodecyl mercaptan, or t-tetradecyl mercaptan; a thioglycolate ester such as 2-ethylhexyl thioglycolate, ethylene glycol dithioglycolate, trimethylolpropane tris(thioglycolate), or pentaerythritol tetrakis(thioglycolate); thiophenol; tetraethylthiuram disulfide; pentane phenyl ethane; acrolein; methacrolein; allyl alcohol; carbon tetrachloride; ethylene bromide; a styrene oligomer such as α-methyl styrene dimer; and terpinolene. Among them, an alkyl mercaptan-based chain transfer agent and thiophenol are preferred, and a primary alkyl mercaptan-based chain transfer agent and/or a secondary alkyl mercaptan-based chain transfer agent are/is more preferred. Particularly, the amount of the chain transfer agent used in the polymerization stage (I) is preferably 0 to 6 parts by weight per 100 parts by weight of the monomer mixture (a). When the chain transfer agent is used in the polymerization stage (III), a resulting resin composition may have improved heat resistance evaluated by, for example, deflection temperature under load. The amount of the chain transfer agent used in the polymerization stage (III) is preferably 0 to 3 parts by weight per 100 parts by weight of the monomer mixture (c). If the amount of the chain transfer agent used in the polymerization stage (III) exceeds 3 parts by weight, there is a case where the effect of improving impact strength cannot be sufficiently obtained.

The graft copolymer used in one or more embodiments of the present invention can be produced by common emulsion polymerization using a known emulsifier Examples of the emulsifier include: an anion surfactant such as sodium alkyl sulfonate, sodium alkylbenzene sulfonate, sodium dioctyl sulfosuccinate, sodium lauryl sulfate, a fatty acid sodium salt, or a phosphate ester salt such as sodium polyoxyethylene lauryl ether phosphate; and a nonionic surfactant. These surfactants ay be used singly or in combination of two or more of them. Particularly, from the viewpoint of improving the thermal stability of a resin composition comprising the graft copolymer and an acrylic resin and a molded article of the resin composition, emulsion polymerization is preferably performed using a phosphate ester salt (especially, an alkali metal phosphate ester salt or an alkaline-earth metal phosphate ester salt) such as sodium polyoxyethylene lauryl ether phosphate.

From the viewpoint of improving the thermal stability of a resin composition comprising the graft copolymer and an acrylic resin and a molded article of the resin composition, a polymerization initiator used in multistage polymerization for obtaining the graft copolymer according to one or more embodiments of the present invention is preferably one whose 10-hr half-life temperature is 100° C. or lower. The polymerization initiator is not particularly limited as long as its 10-hr half-life temperature is 100° C. or lower, but is preferably a persulfate such as potassium persulfate, sodium persulfate, or ammonium persulfate. Among them, potassium persulfate is particularly preferred.

Further, the polymerization is preferably performed by a method in which radicals are generated by cleaving the polymerization initiator substantially only by a pyrolysis mechanism. An alternative to such a method is a method described in the example in Japanese Patent No. 3960631 in which an oxidizing agent such as ferrous sulfate and a reducing agent such as sodium formaldehyde sulfoxylate are used in combination as a redox initiator to generate radicals from a reagent that can generate radicals at low temperature. However, when such a redox initiator system is applied to one or more embodiments of the present invention, there is a case where a large amount of radicals is generated at a time. More specifically, when a polymer layer mainly containing a methacrylate ester is formed by polymerization using a redox initiator in at least the polymerization stage (I), there is a case Where a large amount of radicals is generated at a time, and therefore a bond that is cleaved by relatively low energy, such as a head-to-head bond, is formed in the polymer mainly containing a methacrylate ester. In this case, when the graft copolymer is exposed to high temperatures during molding processing or the like, such a bond is likely to become a starting point of zipping depolymerization so that the thermal stability of the graft copolymer is significantly impaired, which as a result may impair the color of a resulting molded article or cause defective molding such as mold staining. For this reason, the polymerization initiator is preferably cleaved only by a pyrolysis mechanism without using a redox initiator.

From the above viewpoint, the 10-hr half-life temperature of the polymerization initiator is preferably 100° C. or lower, more preferably 90° C. or lower, even more preferably 80° C. or lower, particularly preferably 75° C. or lower.

The polymerization initiator is preferably used for polymerization in at least the polymerization stage (I) performed to obtain the graft copolymer and is more preferably used for polymerization in the polymerization stage performed to obtain the graft copolymer in which a chain transfer agent such as n-octyl mercaptan is used. Particularly preferably, the polymerization initiator is used for polymerization in all the polymerization stages performed to obtain the graft copolymer.

The thus obtained graft copolymer latex is spray-dried to obtain a powdery graft copolymer. Alternatively, as generally known, the graft copolymer latex may be coagulated by adding a salt or an acid, heat treated, filtered, washed, and dried to obtain a powdery graft copolymer. Particularly preferably, the graft copolymer latex is coagulated using a salt. The salt to be used is not particularly limited, but is preferably a bivalent salt such as a calcium salt such as calcium chloride or a magnesium salt such as magnesium chloride or magnesium sulfate, and is particularly preferably a magnesium salt such as magnesium chloride or magnesium sulfate.

If necessary, an antioxidant or an ultraviolet absorber usually added during coagulation may be added.

Further, if necessary, the graft copolymer latex may be filtered through a filter, a mesh, or the like before coagulation to remove fine polymerization scale, which makes it possible to reduce fish-eyes or foreign objects resulting from such fine polymerization scale to improve the appearance of a resin composition and a molded article according to one or more embodiments of the present invention.

It is known that the mechanical strength of an acrylic resin or the like is improved by adding a soft polymer. However, in this case, there is a drawback that the soft polymer is homogeneously mixed with a matrix resin (here corresponding to the acrylic resin) so that a resulting molded article has low heat resistance. On the other hand, when a graft copolymer is added which has a soft cross-linked polymer and a hard polymer (also called multistage-polymerized polymer, multilayer structure polymer, or core-shell polymer), a resulting molded article has a discontinuous sea-island structure in which the soft cross-linked polymer layer corresponds to "island" and the matrix resin and the hard polymer layer correspond to "sea". Therefore, the graft copolymer is effective at improving mechanical strength almost without reducing heat resistance. Further, the soft cross-linked polymer generally has a composition different from that of the matrix resin, which makes it difficult to uniformly disperse the soft cross-linked polymer in the matrix resin. Therefore, the soft cross-linked polymer causes a deterioration in optical properties such as transparency or defects such as fish-eyes, and further causes a reduction in mechanical strength. However, in the case of the graft copolymer having both a soft cross-linked polymer and a hard polymer, the soft cross-linked polymer can be uniformly dispersed in the matrix.

From the viewpoint of transparency and mechanical strength, the average particle diameter of "islands (domains)" in a resin composition (molded article) in which the graft copolymer is dispersed in an acrylic resin is preferably 42 to 165 nm. From the viewpoint of mechanical strength, the average particle diameter is more preferably 65 nm or more, even more preferably 85 nm or more, particularly preferably 95 nm or more. On the other hand, from the viewpoint of transparency, the average particle diameter is more preferably 160 nm or less, even more preferably 155 nm or less. Here, the average particle diameter of islands (domains) refers to the average particle diameter of 30 rubber particles determined in the following manner. An ultrathin slice is cut out from a molded article with the use of a diamond knife. Then, the slice is stained with a staining agent such as ruthenium tetraoxide or osmium tetraoxide, and its image observed with a scanning electron microscope is taken. Then, 30 rubber particles appearing in their entirety in the image as islands (domains) are randomly selected, the particle diameter of each of the rubber particles is measured, and the average particle diameter of these rubber particles is determined.

In one or more embodiments of the present invention, the term "soft" means that the glass transition temperature of the polymer is lower than 20° C. From the viewpoint of enhancing the ability of the soft layer to absorb impact and enhancing the effect of improving impact resistance such as cracking resistance, the glass transition temperature of the polymer is preferably lower than 0° C., more preferably lower than −20° C.

In one or more embodiments of the present invention, the term "hard" means that the glass transition temperature of the polymer is 20° C. or higher. If the glass transition temperature of the polymer is lower than 20° C. then the heat resistance of a resin composition containing the graft copolymer and a molded article of the resin composition is reduced, or the graft copolymer is likely to become coarse or agglomerated during the production of the graft copolymer.

In one or more embodiments of the present invention, the glass transition temperature of the "soft" or "hard" polymer is calculated by the FOX equation using values described in Polymer Hand Book (J. Brandrup, Interscience 1989) (for example, the glass transition temperature of polymethyl methacrylate is 105° C. and the glass transition temperature of polybutyl acrylate is −54° C.).

In one or more embodiments of the present invention, the polymer (I) obtained in the polymerization stage (I) is a hard polymer, the polymer (II) obtained in the polymerization stage (I) is a soft polymer, and the polymer (III) obtained in the polymerization stage (III) is a hard polymer.

The graft copolymer obtained in the above-described manner offers an excellent balance of appearance, transparency, whether resistance, luster, processability, and thermal stability, and can be blended with various thermoplastic resins. However, the grail copolymer is particularly preferably blended with an acrylic resin. When the graft copolymer is blended with an acrylic resin, a resin composition excellent in thermal stability, weather resistance, luster, and processability can be provided without impairing excellent color, appearance, and transparency characteristic of acrylic resin.

An indicator of the thermal stability of the graft copolymer may be a weight loss temperature determined by heating the polymer. The graft copolymer according to one or more embodiments of the present invention preferably has a 1% weight loss temperature of 260° C. or higher and a 5% weight loss temperature of 310° C. or higher as measured by thermal stability analysis (thermogravimetric analysis, TGA). The 1% weight loss temperature is more preferably 265° C. or higher, particularly preferably 270° C. or higher. The 5% weight loss temperature is more preferably 315° C. or higher, even more preferably 320° C. or higher, particularly preferably 330° C. or higher. When the graft copolymer has a 1% weight loss temperature of 260° C. or higher and a 5% weight loss temperature of 310° C. or higher as measured by thermal stability analysis, a resin composition (molded article) comprising the graft copolymer and an acrylic resin is excellent in color. Here, when the YI value of the molded article is lower, the molded article has lower yellowness and is therefore regarded as more excellent in color.

(Acrylic Resin)

An acrylic resin used in one or more embodiments of the present invention is a resin generally called acrylic resin and containing 30 wt % or more of an alkyl inethaciylate ester unit whose alkyl group has 1 to 4 carbon atoms. A typical example of the acrylic resin is a (co)polymer comprising 30 to 100 wt % of methyl methacrylate and 70 to 0 wt % of another copolymerizable monomer. The methyl methacrylate content of the (co)polymer is more preferably 50 to 100 wt %, even more preferably 50 to 99.9 wt %, still more preferably 50 to 98 wt %, and the another copolymerizable monomer content of the (co)polymer is more preferably 50 to 0 wt %, even more preferably 50 to 0.1 wt %, still more preferably 50 to 2 wt %. Examples of the another copolymerizable monomer include: (meth)acrylate esters such as methyl acrylate, ethyl (meth)acrylate, propyl (meth)acrylate, butyl (meth)acrylate, hexyl (meth)acrylate, cyclohexyl (meth)acrylate, 2-ethylhexyl (meth)actylate, octyl (meth) acrylate, isobornyl (meth)acrylate, phenyl (meth)acrylate, and enzyl (meth)acrylate; aromatic vinyl monomers such as styrene, o-methyl styrene, m-methyl styrene, p-methyl styrene, and α-methyl styrene; unsaturated nitrile-based monomers such as acrylonitrile and methacrylonitrile; α,β-unsaturated carboxylic acids such as acrylic acid, methacrylic acid, and crotonic acid; vinyl acetate; olefin-based monomers such as ethylene and propylene; vinyl halide-based monomers such as vinyl chloride, vinylidene chloride, and vinylidene fluoride; and maleimide-based monomers such as N-ethyl maleimide, N-propyl maleimide, N-cyclohexyl maleimide, and N-o-chlorophenyl maleimide. These copolymerizable monomers may be used singly or in combination of two or more of them.

Further, when a resulting molded article is used for optical members, the acrylic resin preferably has a glass transition temperature of 115° C. or higher. More specifically, the acrylic resin may be an acrylic resin containing a maleimide structure, a glutarimide structure, a glutaric anhydride structure, a (meth)acrylic acid unit, or a lactone ring in its molecule, or a methacrylic resin. Examples of the acrylic resin include a maleimide acrylic resin, a glutarimide acrylic resin, a glutaric anhydride acrylic resin, a lactone ring-containing acrylic resin, an acrylic resin containing a hydroxyl group and/or a carboxyl group, and a methacrylic resin.

The mixing ratio between the acrylic resin and the graft copolymer varies depending on the intended use of a resulting resin composition, but 40 to 98 parts by weight of the acrylic resin and 60 to 2 parts by weight of the graft copolymer (per 100 parts by weight of the total amount of the acrylic resin and the graft copolymer) are preferably mixed, 50 to 95 parts by weight of the acrylic resin and 50 to 5 parts by weight of the graft copolymer are more preferably mixed, and 50 to 90 parts by weight of the acrylic resin and the 50 to 10 parts by weight of the graft copolymer are particularly preferably mixed. If the amount of the acrylic resin is less than 40 parts by weight, there is a case where properties characteristic of the acrylic resin is lost, and if the amount of the acrylic resin exceeds 98 parts by weight, there is a case where impact strength is not sufficiently improved.

A mixing method used to prepare a resin composition according to one or more embodiments of the present invention is not particularly limited, and various known methods such as extrusion kneading and roll kneading may be used.

If necessary, the resin composition according to one or more embodiments of the present invention may contain any known additive such as a light stabilizer, a UV absorber, a heat stabilizer, a delustering agent, a light diffusing agent, a coloring agent, a dye, a pigment, an antistatic agent, a heat reflecting agent, a lubricant, a plasticizer, a UV absorber, a stabilizer, or a filler or another resin.

(Molded Article)

The resin composition according to one or more embodiments of the present invention can be molded by a known molding method. For example, the resin composition according to one or more embodiments of the present invention is appropriately formed into a molded article by an injection molding method, a press method, a common melt extrusion method such as an inflation method or a T-die extrusion method, a calender method, or a solvent casting method. Particularly, when the resin composition according to one or more embodiments of the present invention is molded into a film, molding by a melt extrusion method using no solvent is significant because the resin composition according to one or more embodiments of the present invention has excellent thermal stability.

When the acrylic resin composition according to one or more embodiments of the present invention is molded into a film by melt extrusion, the acrylic resin composition according to one or more embodiments of the present invention is first supplied to an extruder and melted by heating. When the acrylic resin composition is supplied to an extruder, each of the components of the acrylic resin composition may be directly supplied as particles to the extruder or pellets of the resin composition previously prepared by the extruder may be supplied to the extruder. The resin composition is preferably subjected to preliminary drying before supplied to the extruder.

The extruder for molding the resin composition according to one or more embodiments of the present invention into a film preferably has one or more devolatilizers for removing volatile matter generated during melting by heating. When the resin composition is subjected to melt extrusion, an inert gas such as nitrogen or helium is preferably supplied to a cylinder of the extruder together with the resin material.

Then, the resin composition melted by heating in the extruder is supplied through a gear pump or a filter to a T-die. At this time, the use of a gear pump makes it possible to improve the uniformity of the amount of the resin to be extruded to reduce thickness variation. On the other hand, the use of a filter makes it possible to remove foreign matter in the resin composition to obtain a film having an excellent appearance without defects. The filter to be used is preferably a stainless steel leaf disc filter capable of removing foreign matter from a melted polymer. The filter can be suitably used for an extruder or the like for use in pelletization or film formation.

Then, the resin composition supplied to the T-die is extruded through the T-die as a sheet-shaped melted resin. Then, the sheet-shaped melted resin is cooled using two or more cooling rolls.

Examples of a method for bringing the sheet-shaped melted resin into close contact with the first casting roll (first cooling roll) include a touch roll method, a nip roll method, an electrostatic application method, an air knife method, a vacuum chamber method, a calender method, and a sleeve method. An appropriate method is selected according to the thickness or intended use of the film.

When the resin composition is molded into a film, if necessary, both surfaces of the film may be brought into contact with (the film may be sandwiched between rolls or metal belts, especially rolls or metal belts heated to a temperature around the glass transition temperature, at the same time so that the film can have more excellent surface properties. One of the two cooling rolls sandwiching the sheet-shaped melted resin is preferably a rigid metal roll having a smooth surface, and the other cooling roll is preferably a flexible roll having an elastically-deformable metal elastic external cylinder having a smooth surface.

The thickness of the film according to one or more embodiments of the present invention is not particularly limited, but is preferably 500 μm or less, more preferably 300 μm or less, particularly preferably 200 μm or less. Further, the thickness is preferably 10 μm or more, more preferably 30 μm or more, even more preferably 50 μm or more, particularly preferably 60 μm or more. When the thickness of the film is within the above range, there is an advantage that, when vacuum molding is performed using the film deformation is less likely to occur and a deep-drawn portion is less likely to be broken, and further the film can have uniform optical properties and excellent transparency. On the other hand, if the thickness of the film exceeds the above upper limit, the film is non-uniformly cooled after molding, and therefore tends to have non-uniform optical properties. If the thickness of the film is less than the above lower limit, there is a case where the film is difficult to be handled.

When the film according to one or more embodiments of the present invention has a thickness of 80 μm, the total luminous transmittance of the film is preferably 85% or higher, more preferably 88% or higher, even more preferably 90% or higher. When the total luminous transmittance is within the above range, the film has high transparency, and is therefore suitable for optical members required to have light permeability, decorative applications, interior applications, and vacuum molding.

The film according to one or more embodiments of the present invention preferably has a glass transition temperature of 90° C. or higher, more preferably 100° C. or higher, even more preferably 110° C. or higher, even more preferably 115° C. or higher, particularly preferably 120° C. or higher, most preferably 124° C. or higher. When the glass transition temperature is within the above range, the acrylic resin film can have excellent heat resistance.

When the film according to one or more embodiments of the present invention has a thickness of 80 μm, the haze of the film is preferably 2.0% or less, more preferably 1.5% or less, even more preferably 1.3% or less, particularly preferably 1.0% or less. Further, the inner haze of the film is preferably 1.5% or less, more preferably 1.0% or less, even more preferably 0.5% or less, particularly preferably 0.3?/or less. When the haze and the inner haze are within their respective ranges described above, the film has high transparency, and is therefore suitable for optical merribers required to have light permeability, decorative applications, interior applications, and vacuum molding. It is to be noted that the haze includes the haze of inside of the film and the haze of surface (outside) of the film which are referred to as inner haze and outer haze, respectively.

The film according to one or more embodiments of the present invention has high toughness and high flexibility even as an unstretched film. However, the acrylic resin film according to one or more embodiments of the present invention may further be stretched to improve mechanical strength and film thickness accuracy.

When the film according to one or more embodiments of the present invention is a stretched film, the stretched film (uniaxially-stretched film or biaxially-stretched film) can be produced by once molding the resin composition according to one or more embodiments of the present invention into a unstretched film and then uniaxially or biaxially stretching the unstretched film.

When stretched, the unstretched film may be continuously stretched immediately after molding, or may be stretched after once stored or transferred after molding.

A method for stretching the unstretched film is not particularly limited, and any conventionally-known stretching method may be used. Specific examples of such a method include transverse stretching using a tenter, longitudinal stretching using rolls, and successive biaxial stretching in which transverse stretching and longitudinal stretching are successively performed in combination. Alternatively, a simultaneous biaxial stretching method may be used in Which longitudinal stretching and transverse stretching are performed at the same time, or a method may be used in which longitudinal stretching using rolls is performed and then transverse stretching using a tenter is performed.

When stretched, the unstretched film is preferably once preheated to a temperature higher than a stretching temperature by 0.5° C. to 5° C., preferably 1° C. to 3° C. and then cooled to the stretching temperature before stretching.

The stretching temperature is not particularly limited, and may be changed according to mechanical strength, surface properties, and thickness accuracy required of a stretched film to be produced. When the glass transition temperature of the unstretched film determined by a DSC method is defined as Tg, the stretching temperature is generally preferably in the range of (Tg−30° C.) to (Tg+30° C.), more preferably in the range of (Tg−20° C.) to (Tg+20° C.), even more preferably (Tg) to (Tg+20° C.).

A stretching ratio is not particularly limited, and may be determined according to mechanical strength, surface properties, and thickness accuracy required of a stretched film to be produced. Depending on the stretching temperature, the stretching ratio is generally preferably selected in the range of 1.1 times to 3 times, more preferably selected in the range of 1.3 times to 2.5 times, even more preferably selected in the range of 1.5 times to 2.3 times. When the stretching ratio is within the above range, the mechanical properties of the film such as percentage of elongation, tear propagation strength, and resistance to flexural fatigue can be significantly improved.

(Applications)

The resin composition and the molded article according to one or more embodiments of the present invention can be used for various purposes by taking advantage of their properties such as optical properties, such as color, appearance, and transparency, and mechanical strength such as impact resistance. For example, the resin composition and the molded article according to one or more embodiments of the present invention can be used for car headlights, tail lamp lenses, inner lenses, instrument covers, sunroofs, and the like for use in the field of vehicles; head-up displays, display front panels, and the like for use in the field of displays; road signs, bathroom fitments, floor materials, translucent panels for roads, lenses for double glazing, lighting windows, carports, lenses for lighting, lighting covers, sidings for construction materials, and the like for use in the fields of architecture and construction materials; microwave cooking vessels (dishes); housings for home appliances; toys; sunglasses; and stationery.

If necessary, the surface gloss of the film according to one or more embodiments of the present invention can be reduced by a known method. This can be achieved by, for example, kneading the resin composition with an inorganic filler or cross-linkable polymer particles. Alternatively, the film obtained may be embossed to reduces its surface gloss.

If necessary, the film according to one or more embodiments of the present invention may be laminated on another film with an adhesive or the like or coated with a surface coating layer such as a hard coat layer before use.

The film according to one or more embodiments of the present invention can be used for, for example, interior and exterior of cars, personal computers, mobile devices, and solar batteries; solar battery backsheets; image taking lenses for cameras, VTRs, and projectors, finders, filters, prisms, Fresnel lenses, lens covers, and the like for use in the field of imaging; lenses such as pick-up lenses for optical discs in CD players, DVD players, MD players, and the like; optical discs such as CDs, DVDs, and MDs for use in the field of optical recording; films for organic EL devices, front panels for liquid crystal displays in terminals such as mobile phones, smartphones, tablets, and the like, films for liquid crystal displays such as light guide plates, diffuser plates, backsheets, reflection sheets, optical isotropic films, transparent conductive films, polarizer protective films, polarizing film transparent resin sheets, phase difference films, light diffusion films, prism sheets, and the like, surface protective films, and the like for use in the field of information devices; optical fibers, optical switches, optical connectors, and the like for use in the field of optical communications; car headlights, tail lamp lenses, inner lenses, instrument covers, sunroofs, and the like for use in the field of vehicles; eyeglasses, contact lenses, lenses for endoscopes, medical supplies requiring sterilization, and the like for use in the field of medical devices; road signs, bathroom fitments, floor materials, translucent panels for roads, lenses for double glazing, lighting windows, carports, lenses for lighting, lighting covers, sidings for construction materials, and the like for use in the fields of architecture and construction materials; microwave cooking vessels (dishes); housings for home appliances; toys; sunglasses; and stationery. Further, the film according to one or more embodiments of the present invention can be used also as a substitute for a molded product using a transfer foil sheet.

The film according to one or more embodiments of the present invention can be used by laminating it on a base material such as a metal or plastic. Examples of a method for laminating the acrylic resin film include lamination molding, wet lamination in which an adhesive is applied onto a metal plate, such as a steel plate, and then the film is placed on and bonded to the metal plate by drying, lamination, extrusion lamination, and hot melt lamination.

Examples of a method for laminating the film on a plastic part include insert molding or laminate injection press molding in which the film is placed in a mold and then a resin is injected into the mold, and in-mold molding in which the preliminarily-molded film is placed in a mold and then a resin is injected into the mold.

A laminate using the film according to one or more embodiments of the present invention can be used for alternatives to painting such as interior or exterior materials for cars, building materials such as window frames, bathroom fitments, wallpapers, and floor materials, daily goods, housings for furniture and electric devices, housings for OA equipment such as facsimiles, notebook computers, and copy machines, front panels for liquid crystal displays in terminals such as mobile phones, smartphones, and tablets, optical members such as lighting lenses, car headlights, optical lenses, optical fibers, optical discs, and light guide plates for liquid crystal displays, parts of electric or electronic devices, medical supplies requiting sterilization, toys, and recreational goods.

EXAMPLES

Hereinbelow, one or more embodiments of the present invention will be more specifically described with reference to examples, but is not limited to these examples. The terms "part(s)" and "%" as used hereinafter refer to "part(s) by weight" and "% by weight", respectively, unless otherwise specified.

The abbreviations of compounds shown in a method for producing a graft copolymer, which will be described later, are as follows.
MMA: methyl methacrylate
BA: n-butyl acrylate
St: styrene
AlMA: allyl methacrylate
DA: generic term for di(meth)acrylic compound
TPGDA: tripropylene glycol diactylate (average molecular weight: 300, m+n in Formula (2) is 3)
PEG #200DA: polyethylene glycol diacrylate (average molecular weight: 308, m in Formula (1) is 4)
PEG #400DA: polyethylene glycol diacrylate (average molecular weight: 508, m in Formula (1) is 9)
PEG #600DA: polyethylene glycol diacrylate (average molecular weight: 708, m in Formula (1) is 14)
n-OM: n-octylmercaptan (Average Particle Diameter of Polymer Obtained by Performing up to Polymerization for Forming Intermediate Layer of Graft Copolymer)

The average particle diameter of a polymer was measured using a polymer latex obtained by performing up to polymerization for forming the intermediate layer. More specifically, the average particle diameter was determined by measuring 546 nm-light scattered from the polymer latex with the use of Ratio Beam Spectrophotometer U-5100 manufactured by Hitachi High-Technologies Corporation.

(Polymerization Conversion Ratio)

The polymerization conversion ratio of a polymer obtained by polymerization was determined in the following manner.

A sample containing a polymer (polymer latex) obtained from a polymerization system, and about 2 g of the sample was weighed. The thus obtained sample was dried at 120° C. for 1 hour in a hot-air dryer, and was then accurately weighed to determine the weight of solid matter. Then, the ratio between the results of accurate measurements before and after drying was determined as the solid content of the sample. Finally, a polymerization conversion ratio was calculated by the following calculation formula using the solid content. It is to be noted that in this calculation formula, the polyfunctional monomer and the chain transfer agent were regarded as monomers charged.

Polymerization conversion ratio (%)={(total weight of raw materials charged×solid content−total weight of raw materials other than water and monomers)/weight of monomers charged}×100

(Evaluation of Thermal Stability)
<Weight Loss Temperature of Graft Copolymer>

The 1% weight loss temperature and the 5% weight loss temperature of a graft copolymer were measured in the following manner. First, an obtained graft copolymer was preliminarily dried at 80° C. overnight. Then, the temperature of the preliminarily dried graft copolymer was increased from 30° C. to 465° C. at a rate of 10° C./min in a nitrogen stream with the use of EXSTAR EG/DTA7200 manufactured by SII Technology to measure the loss of weight at this time. The temperature at which the weight loss reached 1% of the initial weight is defined as 1% weight loss temperature, and the temperature at which the weight loss reached 5% of the initial weight is defined as 5% weight loss temperature.

(Tensile Elongation)

A tensile test was performed in accordance with HS K 7161 to measure tensile elongation at a test speed of 5 mm/min.

(Izod Impact Test)

An Izod impact test (temperature: 23° C., humidity: 50%) was performed in accordance with ASTM D-256. The measurement was performed using a ¼-inch test piece (with V notch) obtained by injection molding.

(Haze Value)

The haze value (Haze) of a resin composition (molded article) was measured by a method described in JIS K7105 using NDH-300A manufactured by NIPPON DENSHOKU INDUSTRIES CO., LTD. The measurement was performed using a 3 mm-thick flat test piece formed by injection molding.

(Transparent YI (Yellowness Index))

A color meter (ZE-2000 manufactured by NIPPON DENSHOKU INDUSTRIES CO., LTD.) in accordance with JIS Z8722 was used in transparent mode. The measurement was performed using a 3 min-thick flat test piece formed by injection molding.

(Melt Flow Rate (MFR))

A melt flow rate was measured in accordance with JIS K 7210 at a test temperature of 230° C. and a load of 3.8 kg.

(HDT)

A deflection temperature under load was measured in accordance with JIS K 7191 at a load of 1.86 MPa Production Example 1

<Production of Graft Copolymer (B1)>

The following materials were fed into a polymerization apparatus having a capacity of 8 liters and equipped with a stirrer.

| Deionized water | 175 parts |
|---|---|
| Polyoxyethylene lauryl ether phosphoric acid | 0.02 parts |
| Boric acid | 0.4725 parts |
| Sodium carbonate | 0.04725 parts |

Air in the polymerization apparatus was sufficiently purged with nitrogen gas, and then the temperature in the polymerization apparatus was set to 80° C. Then, 0.027 parts of potassium persulfate was fed as a 2% aqueous solution, and then materials for use in the polymerization stage (I) shown in Table 1 and 0.2196 parts of polyoxyethylene lauryl ether phosphoric acid were continuously added for 24 minutes. After a lapse of 20 minutes from the start of addition of materials for use in the polymerization stage (I), 0.0029 parts of sodium hydroxide was fed as a 2% aqueous solution. Further, polymerization was continued for 60 mutes to obtain a polymer (I). The polymerization conversion ratio was 97.0%.

Then, 0.0368 parts of sodium hydroxide was added as a 2% aqueous solution, and 0.091 parts of potassium persulfate was added as a 2% aqueous solution. Then, materials for use in the polymerization stage (II) shown in Table 1 and 0.3213 parts of polyoxyethylene lauryl ether phosphoric acid were continuously added for 207 minutes. After the completion of the addition, 0.015 parts of potassium persulfate was added as a 2% aqueous solution, and polymerization was continued for 120 minutes to obtain a polymer (II). The polymerization conversion ratio was 99.9%, and the average particle diameter was 122 nm.

Then, 0.023 parts of potassium persulfate was added as a 2% aqueous solution, materials for use in the polymerization stage (III) shown in Table 1 were continuously added for 70 minutes, and polymerization was further continued for 60 minutes to obtain a graft copolymer latex. The polymerization conversion ratio was 100.0%. The obtained latex was coagulated by salting out using magnesium chloride, washed with water, and dried to obtain a white powdery graft copolymer (B1).

Production Examples 2 to 5

<Production of Graft Copolymers (B2) to (B5)>

White powdery graft copolymers (B2) to (B5) were obtained in the same manner as in Production Example 1 except that the raw materials were changed as shown in Table 1. The average particle diameter of the latex obtained by performing up to polymerization for forming the intermediate layer is shown in Table 1.

(Production Example 6)

<Production of Graft Copolymer (B6)>

The following materials were fed into a polymerization apparatus having a capacity of 8 liters and equipped with a stirrer.

| Deionized water | 175 parts |
|---|---|
| Polyoxyethylene lauryl ether phosphoric acid | 0.02 parts |
| Boric acid | 0.4725 parts |
| Sodium carbonate | 0.04725 parts |

Air in the polymerization apparatus was sufficiently purged with nitrogen gas, and then the temperature in the polymerization apparatus was set to 80° C. Then, 0.027 parts of potassium persulfate was fed as a 2% aqueous solution, and then materials for use in the polymerization stage (I) shown in Table 1 and 0.2196 parts of polyoxyethylene lauryl ether phosphoric acid were continuously added for 24 minutes. After a lapse of 20 minutes from the start of addition of materials for use in the polymerization stage (I), 0.0029 parts of sodium hydroxide was fed as a 2% aqueous solution. Further, polymerization was continued for 60 minutes to obtain a polymer (I). The polymerization conversion ratio was 96.0%.

Then, 0.0368 parts of sodium hydroxide was added as a 2% aqueous solution, and 0.091 parts of potassium persulfate was added as a 2% aqueous solution. Then, materials for use in the polymerization stage (II) shown in Table 1 and 0.3213 parts of polyoxyethylene lauryl ether phosphoric acid were continuously added for 207 minutes. After the completion of the addition, 0.015 parts of potassium persulfate was added as a 2% aqueous solution, and polymerization was continued for 120 minutes to obtain a polymer (II). The polymerization conversion ratio was 100.0%, and the average particle diameter was 123 nm.

Then, 0.023 parts of potassium persulfate was added as a 2% aqueous solution, materials for use in the polymerization stage (III-1) shown in Table 1 were continuously added for 45 minutes, polymerization was further continued for 30 minutes, materials for use in the polymerization stage (III-2) shown in Table 1 were continuously added for 25 minutes, and polymerization was further continued for 60 minutes to obtain a graft copolymer latex. The polymerization conversion ratio was 100.0%. The obtained latex was coagulated by salting out using magnesium chloride, washed with water, and dried to obtain a white powdery graft copolymer (136).

Production Examples 7 to 11

<Production of Graft Copolymers (B7) to (B11)>

White powdery graft copolymers (B7) to (B11) were obtained in the same manner as in Production Example 1 except that the raw materials were changed as shown in Table 1. The average particle diameter of the latex obtained by performing up to polymerization for forming the intermediate layer is shown in Table 1.

Production Examples 12 to 14

<Production of Graft Copolymers (B12) to (B14)>

The following materials were fed into a polymerization apparatus having a capacity of 8 liters and equipped with a stirrer.

| | |
|---|---|
| Deionized water | 175 parts |
| Polyoxyethylene lauryl ether phosphoric acid | 0.0023 parts |
| Boric acid | 0.4725 parts |
| Sodium carbonate | 0.04725 parts |

Then, white powdery graft copolymers (B12) to (B14) were obtained in the same manner as in Production Example 1 except that the raw materials were changed as shown in Table 1. The average particle diameter of the latex obtained by performing up to polymerization for forming the intermediate layer is shown in Table 1.

(Evaluation of Thermal Stability of Graft Copolymer)

The thermal stability of each of the graft copolymers B1 to B14 obtained in Production Examples 1 to 14 was evaluated in the above-described manner. The results are shown in Table 1.

Examples 1 to 7, Comparative Examples 1 to 7

<Preparation of Molded Article>

Each of the graft copolymers B1 to 314 obtained in Production Examples 1 to 14 and an acrylic resin A1 (PMMA resin, Delpowder 80N (manufactured by Asahi Kasei Chemicals Corporation) were extrusion kneaded at a ratio shown in Table 2 using a vent-equipped twin-screw extruder (TEX44SS-30BW-3V manufactured by THE JAPAN STEEL WORKS, LTD.) at a preset temperature of C2 to C3 of 210° C., a preset temperature of C4 of 220° C., a preset temperature of C5 to C9 of 230° C., and a preset temperature of D of 240° C., a screw rotation speed of 100 rpm, and a discharge rate of 10 to 15 kg/hr and pelletized to obtain pellets.

The obtained pellets were dried at 90° C. for 3 hours or longer and then subjected to injection molding using an injection molding machine (160MSP-10 manufactured by Mitsubishi Heavy Industries, Ltd.) at a cylinder temperature T3 of 230° C., a cylinder temperature T2 of 240° C., and a cylinder temperature T1 of 250° C., a nozzle temperature N of 255° C., an injection speed of 19.7%, a mold temperature of 60° C. to obtain a flat plate sample having a thickness of 3 mm and a size of 15 cm×10 cm. The haze and transparent

TABLE 1

| Graft copoly-mer | (I)/(II)/ (III-1)/ (III-2) (parts) | (I) MMA/ BA/St (wt %) | (I) Amount of AIMA/ n-OM per 100 parts of total amount of mono-mers of (I) (parts) | BA/St (wt %) | (II) Type of DA | (II) Amount of DA/ AIMA per 100 parts of total amount of mono-mers of (II) (parts) | Molar ratio of DA/ AIMA | (III-1) MMA/ BA (wt %) | (III-1) Amount of n-OM per 100 parts of total amount of mono-mers of (III) (parts) | (III-2) MMA/ BA (wt %) | Particle diameter of polymer obtained by per-forming up to polymer-ization for forming inter-mediate layer (nm) | Thermal stability evaluation TGA) 1% weight loss temper-ature (° C.) | 5% weight loss temper-ature (° C.) |
|---|---|---|---|---|---|---|---|---|---|---|---|---|---|
| B1 | 8/69/23/0 | 93.2/6/0.8 | 0.5/1.1 | 82/18 | TPGDA | 1.0/0.5 | 0.84 | 95/5 | — | — | 122 | 273.5 | 323.8 |
| B2 | 8/69/23/0 | 93.2/6/0.8 | 0.5/1.1 | 82/18 | TPGDA | 0.5/0.5 | 0.42 | 95/5 | — | — | 119 | 275.6 | 326.3 |
| B3 | 8/69/23/0 | 93.2/6/0.8 | 0.5/1.1 | 82/18 | PEG#200DA | 1.0/0.5 | 0.82 | 95/5 | — | — | 124 | 268.1 | 320.6 |
| B4 | 8/69/23/0 | 93.2/6/0.8 | 0.5/1.1 | 82/18 | PEG#400DA | 1.78/0.5 | 0.88 | 95/5 | — | — | 122 | 275.3 | 328.7 |
| B5 | 8/69/23/0 | 93.2/6/0.8 | 0.5/1.1 | 82/18 | PEG#600DA | 2.45/0.5 | 0.87 | 95/5 | — | — | 123 | 274.1 | 327.3 |
| B6 | 8/69/15/8 | 93.2/6/0.8 | 0.5/1.1 | 82/18 | TPGDA | 1.0/0.5 | 0.84 | 98.75/1.25 | — | 88/12 | 123 | 275.2 | 328.1 |
| B7 | 8/69/23/0 | 93.2/6/0.8 | 0.5/1.1 | 82/18 | TPGDA | 1.0/0.5 | 0.84 | 98.75/1.25 | 0.22 | — | 124 | 271.1 | 327.9 |
| B8 | 8/69/23/0 | 93.2/6/0.8 | 0.5/1.1 | 82/18 | — | 0/1.5 | 0 | 95/5 | — | — | 118 | 274.6 | 329.3 |
| B9 | 8/69/23/0 | 93.2/6/0.8 | 0.5/1.1 | 82/18 | TPGDA | 1.0/0 | — | 95/5 | — | — | 123 | 275.2 | 327.4 |
| B10 | 8/69/23/0 | 93.2/6/0.8 | 0.5/1.1 | 82/18 | TPGDA | 1.0/0.25 | 1.68 | 95/5 | — | — | 121 | 268.2 | 319.9 |
| B11 | 8/69/23/0 | 93.2/6/0.8 | 0.5/1.1 | 82/18 | TPGDA | 0.5/1.0 | 0.21 | 95/5 | — | — | 175 | 271.9 | 326.9 |
| B12 | 8/69/23/0 | 93.2/6/0.8 | 0.5/1.1 | 82/18 | TPGDA | 1.0/0 | — | 95/5 | — | — | 240 | 277.9 | 334.8 |
| B13 | 8/69/23/0 | 93.2/6/0.8 | 0.5/1.1 | 82/18 | TPGDA | 1.0/0.5 | 0.84 | 95/5 | — | — | 243 | 275.7 | 337.8 |
| B14 | 8/69/23/0 | 93.2/6/0.8 | 0.5/1.1 | 82/18 | — | 0/1.5 | 0 | 95/5 | — | — | 238 | 280.9 | 333.9 |

YI of the obtained flat plate sample were measured as indicators of transparency and color.

Further, ¼-inch test pieces and dumbbell-shaped pieces according to ASTM D638-1 were prepared at the same injection molding temperature to measure impact resistance (Izod) and HDT and to perform a tensile test. The results are shown in Table 2. Further, the MFR was also measured using the pellets.

TABLE 2

|  | Acrylic resin | Graft copolymer | Tensile elongation (%) | Izod (kJ/m2) | Haze (%) | Transparent YI | MFR (g/10 min) | HDT (° C.) |
|---|---|---|---|---|---|---|---|---|
| Example 1 | A1 (60%) | B1 (40%) | 67 | 5.3 | 0.86 | 1.10 | 0.5 | 96.8 |
| Example 2 | A1 (60%) | B2 (40%) | 67 | 4.6 | 0.78 | 1.22 | 0.5 | 97.8 |
| Example 3 | A1 (60%) | B3 (40%) | 70 | 4.7 | 0.74 | 1.24 | 0.6 | 97.6 |
| Example 4 | A1 (60%) | B4 (40%) | 71 | 5.1 | 0.69 | 1.14 | 0.4 | 95.7 |
| Example 5 | A1 (60%) | B5 (40%) | 73 | 5.9 | 0.8 | 0.93 | 0.5 | 97.7 |
| Example 6 | A1 (60%) | B6 (40%) | 73 | 5.1 | 0.78 | 1.22 | 0.5 | 96.3 |
| Example 7 | A1 (60%) | B7 (40%) | 71 | 5.5 | 0.87 | 0.75 | 0.6 | 98.8 |
| Comparative example 1 | A1 (60%) | B8 (40%) | 71 | 3.8 | 0.64 | 1.21 | 0.6 | 96.8 |
| Comparative example 2 | A1 (60%) | B9 (40%) | 49 | 3.1 | 2.7 | 0.97 | 0.5 | 98.2 |
| Comparative example 3 | A1 (60%) | B10 (40%) | 64 | 5.4 | 1.08 | 1.26 | 0.5 | 98.0 |
| Comparative example 4 | A1 (60%) | B11 (40%) | 80 | 4.2 | 0.7 | 1.32 | 0.6 | 97.9 |
| Comparative example 5 | A1 (60%) | B12 (40%) | 39 | 3.8 | 31.7 | 2.04 | 1.2 | 95.8 |
| Comparative example 6 | A1 (60%) | B13 (40%) | 60 | 5.9 | 2.25 | 1.21 | 1.2 | 95.0 |
| Comparative example 7 | A1 (60%) | B14 (40%) | 63 | 6.3 | 1.11 | 0.97 | 1.0 | 94.8 |

It is found that the molded articles obtained in Examples 1 to 7 were superior to the molded articles obtained in Comparative Examples 1 to 7 in balance of Izod impact strength as an indicator of impact resistance and haze as an indicator of transparency.

An additional molded article is obtained in Comparative Example 8. In Comparative Example 8, a graft copolymer was prepared under the same conditions and in accordance with the procedures described in Production Example 3, except that diethylene glycol diacrylate (m=2) disclosed in JP S57-85843 was employed instead of the di(meth)acrylate PEG #200DA (polyethylene glycol diacrylate, m=4) as noted in Table 1. Subsequently the graft copolymer of Comparative Example 8 was subjected to conditions described above for the preparation of the molded article wherein the graft copolymer and an acrylic resin A1 were extrusion kneaded and pelletized so that they could be subjected to subsequent injection molding to obtain a ¼-inch test piece. The ¼-inch test piece was then subjected to Izod impact test, as described above. The results of the test are shown in Table 3 with the Izod impact test results of Examples 3-5 for further comparison.

TABLE 3

|  | Di(meth)acrylate | m | Izod (kJ/m2) |
|---|---|---|---|
| Example 3 | PEG#200 DA | 4 | 4.7 |
| Example 4 | PEG#400 DA | 9 | 5.1 |
| Example 5 | PEG#600 DA | 14 | 5.9 |
| Comparative Example 8 | Diethylene glycol diacrylate from JP S57-85843 | 2 | 3.9 |

Comparative Example 8 indicates that using di(meth)acrylate (m=2) results in a decrease in the mechanical properties related to the material's impact resistance, specifically its Izod impact strength. The value of Izod impact strength Example 3 is approximately 20% higher than that of Comparative Example 8. Molded articles obtained in Examples 3-5 using di(meth)acrylate exhibit superior properties in comparison to the molded article obtained in Comparative Example 8, specifically in regarding Izod impact strength as an indicator of impact resistance.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A graft copolymer comprising:
   an inner layer;
   an intermediate layer; and
   an outer layer,
   wherein the graft copolymer is produced by multistage polymerization and a polymer obtained through polymerization up to and including the intermediate layer has an average particle diameter of 90 to 150 nm,
   wherein the inner layer comprises a hard polymer (I) obtained by polymerizing:
   100 parts by weight of a monomer mixture (a) comprising 40 to 100 wt % of a methacrylate ester, 0 to 15 wt % of an aromatic vinyl monomer, and 0 to 45 wt % of another monomer having a copolymerizable double bond; and
   0.01 to 10 parts by weight of a polyfunctional monomer,
   wherein the intermediate layer comprises a soft polymer (II) obtained by polymerizing:
   100 parts by weight of a monomer mixture (b) comprising 60 to 100 wt % of an acrylate ester and 0 to 40 wt % of another monomer having a double bond copolymerizable with the acrylate ester;
   0.01 to 5 parts by weight of allyl (meth)acrylate; and
   a di(meth)acrylic compound, wherein a molar ratio of the di(meth)acrylic compound to the allyl (meth)acrylate [(molar number of di(meth)acrylic compound)/(molar number of allyl (meth)acrylate)] is 0.3 to 1.6, and wherein the di(meth)acrylic compound is ethylene glycol di(meth)acrylate represented by the following formula (1) and/or propylene glycol di(meth)acrylate represented by the following formula (2):

Formula (1)

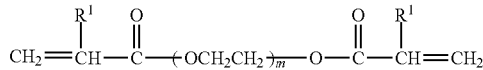

(wherein $R^1$ is H or $CH_3$ and m is 3 to 15);

Formula (2)

(wherein $R^1$ is H or $CH_3$, m and n are each 0 to 13, and m+n is 3 to 13), and wherein the outer layer comprises a hard polymer (III) obtained by polymerizing:

100 parts by weight of a monomer mixture (c) comprising 40 to 100 wt % of a methacrylate ester and 60 to 0 wt % of another monomer having a double bond copolymerizable with the methacrylate ester; and 0 to 10 parts by weight of a polyfunctional monomer.

2. The graft copolymer according to claim 1, wherein the graft copolymer comprises 5 to 15 wt % of the inner layer, 55 to 75 wt % of the intermediate layer, and 20 to 30 wt % of the outer layer.

3. The graft copolymer according to claim 1, wherein the monomer mixture (a) comprises 40 to 99.9 wt % of the methacrylate ester, 0.1 to 35 wt % of an acrylate ester, 0 to 15 wt % of the aromatic vinyl monomer, and 0 to 10 wt % of the another monomer having a copolymerizable double bond.

4. The graft copolymer according to claim 1, wherein the graft polymer has a 1% weight loss temperature of 260° C. or higher as measured by thermogravimetric analysis (TGA) and a 5% weight loss temperature of 310° C. or higher as measured by TGA.

5. A resin composition comprising the graft copolymer according to claim 1 and an acrylic resin.

6. The resin composition according to claim 5, comprising 60 to 2 wt % of the graft copolymer and 40 to 98 wt % of the acrylic resin, wherein a total amount of the acrylic resin and the graft copolymer is 100 wt %.

7. A molded article comprising the resin composition according to claim 5.

8. The molded article according to claim 7, wherein the molded article is an injection molded article.

9. The molded article according to claim 7, wherein the molded article is a film.

10. A method for producing a graft copolymer by multi-stage polymerization, the method comprising:

forming a hard polymer (I) by polymerizing:

100 parts by weight of a monomer mixture (a) comprising 40 to 100 wt % of a methacrylate ester, 0 to 15 wt % of an aromatic vinyl monomer, and 0 to 45 wt % of another monomer having a copolymerizable double bond; and 0.01 to 10 parts by weight of a polyfunctional monomer, forming a soft polymer (II) by polymerizing, in the presence of the hard polymer (I):

100 parts by weight a monomer mixture (b) comprising 60 to 100 wt % of an acrylate ester and 0 to 40 wt % of another monomer having a double bond copolymerizable with the acrylate ester;

0.01 to 5 parts by weight of allyl (meth)acrylate; and a di(meth)acrylic compound, wherein a molar ratio of the di(meth)acrylic compound to the allyl (meth)acrylate [(molar number of di(meth)acrylic compound)/(molar number of allyl (meth)acrylate)] is 0.3 to 1.6, and wherein the di(meth)acrylic compound is ethylene glycol di(meth)acrylate represented by the following formula (1) and/or propylene glycol di(meth)acrylate represented by the following formula (2):

Formula (1)

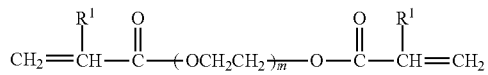

(wherein $R^1$ is H or $CH_3$ and m is 3 to 15);

Formula (2)

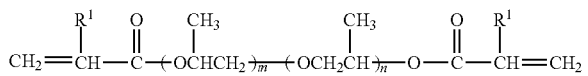

(wherein $R^1$ is H or $CH_3$, m and n are each 0 to 13, and m+n is 3 to 13); and forming a hard polymer (III) polymerizing, in the presence of the soft polymer (II);

100 parts by weight of a monomer mixture (c) comprising 40 to 100 wt % of a methacrylate ester and 60 to 0 wt % of another monomer having a double bond copolymerizable with the methacrylate ester; and 0 to 10 parts by weight of a polyfunctional monomer, wherein a polymer obtained after forming the soft polymer (II) has an average particle diameter of 90 to 150 nm.

11. The resin composition according to claim 5, wherein the graft copolymer is dispersed in the acrylic resin and wherein the average particle diameter is from 95 to 160 nm.

* * * * *